(12) United States Patent  
Tsuyusaki et al.

(10) Patent No.: US 8,875,604 B2  
(45) Date of Patent: Nov. 4, 2014

(54) MACHINE TOOL

(75) Inventors: Umeo Tsuyusaki, Saitaka (JP); Satoru Akimoto, Tokyo (JP); Hiroshi Shinohara, Saitama (JP)

(73) Assignees: Citizen Holdings Co., Ltd, Nishitokyo-shi (JP); Citizen Machinery Miyano Co., Ltd., Nagano (JP)

( * ) Notice: Subject to any disclaimer, the term of this patent is extended or adjusted under 35 U.S.C. 154(b) by 200 days.

(21) Appl. No.: 13/636,411

(22) PCT Filed: Feb. 28, 2011

(86) PCT No.: PCT/JP2011/054449  
§ 371 (c)(1),  
(2), (4) Date: Sep. 21, 2012

(87) PCT Pub. No.: WO2011/118338  
PCT Pub. Date: Sep. 29, 2011

(65) Prior Publication Data  
US 2013/0014619 A1    Jan. 17, 2013

(30) Foreign Application Priority Data  
Mar. 25, 2010   (JP) ................................. 2010-070390

(51) Int. Cl.  
*B23B 13/04* (2006.01)  
*B23B 3/30* (2006.01)  
*B23B 29/26* (2006.01)  
*B23Q 1/62* (2006.01)  
*B23Q 39/02* (2006.01)  
*B23B 3/16* (2006.01)

(52) U.S. Cl.  
CPC . *B23B 3/30* (2013.01); *B23B 29/26* (2013.01); *B23Q 1/626* (2013.01); *B23Q 39/024* (2013.01)  
USPC .............................................. 82/121; 82/117

(58) Field of Classification Search  
None  
See application file for complete search history.

(56) References Cited

U.S. PATENT DOCUMENTS

| | | | |
|---|---|---|---|
| 5,704,262 A * | 1/1998 | Baumbusch et al. ........... | 82/124 |
| 7,249,545 B2 * | 7/2007 | Shinohara et al. ............. | 82/1.11 |
| 7,448,304 B2 * | 11/2008 | Kikuchi et al. ................ | 82/124 |
| 8,707,528 B2 * | 4/2014 | Ozdyk et al. .................. | 29/27 C |
| 2007/0068350 A1 | 3/2007 | Kawasumi | |
| 2009/0308214 A1 | 12/2009 | Watanabe | |

FOREIGN PATENT DOCUMENTS

JP    H02-110401 U1    9/1990  
JP    11510439    9/1999

* cited by examiner

*Primary Examiner* — Will Fridie, Jr.  
(74) *Attorney, Agent, or Firm* — Howson & Howson LLP (57) ABSTRACT

There is provided a machine tool which holds a large number of tools and capable of performing various kinds of works without replacing the tools, which is easy to operate and which allows faster and accurate operations with less number of movable parts. A front tool post (141) and a back spindle (120) are configured to be integrally movable in a Y-axis direction, and a plurality of front working tools (140) and a plurality of back working tools (130) are disposed on the front and back tool posts (141) and (131), respectively, in a plurality of tiers in the Y-axis direction.

7 Claims, 11 Drawing Sheets

MACHINE TOOL

FIELD OF THE INVENTION

The present invention relates to a machine tool comprising front and back spindles respectively having axis lines parallel with each other and pluralities of front and back working tools to perform desired front and back works on a workpiece.

BACKGROUND OF THE INVENTION

Hitherto, in working one workpiece in multilevel, a machine tool which includes front and back main spindles respectively having axis lines parallel with each other and front and back working tools is used and the workpiece is passed sequentially between the spindles. Still further, there is known a machine tool which includes pluralities of front and back working tools and switches the tools only by controlling the machine tool. Thereby, the machine tool permits to decrease frequency of replacing the tools even if work types are frequently changed and to deal with small lot production of many products in a shorter time.

Figure 11:
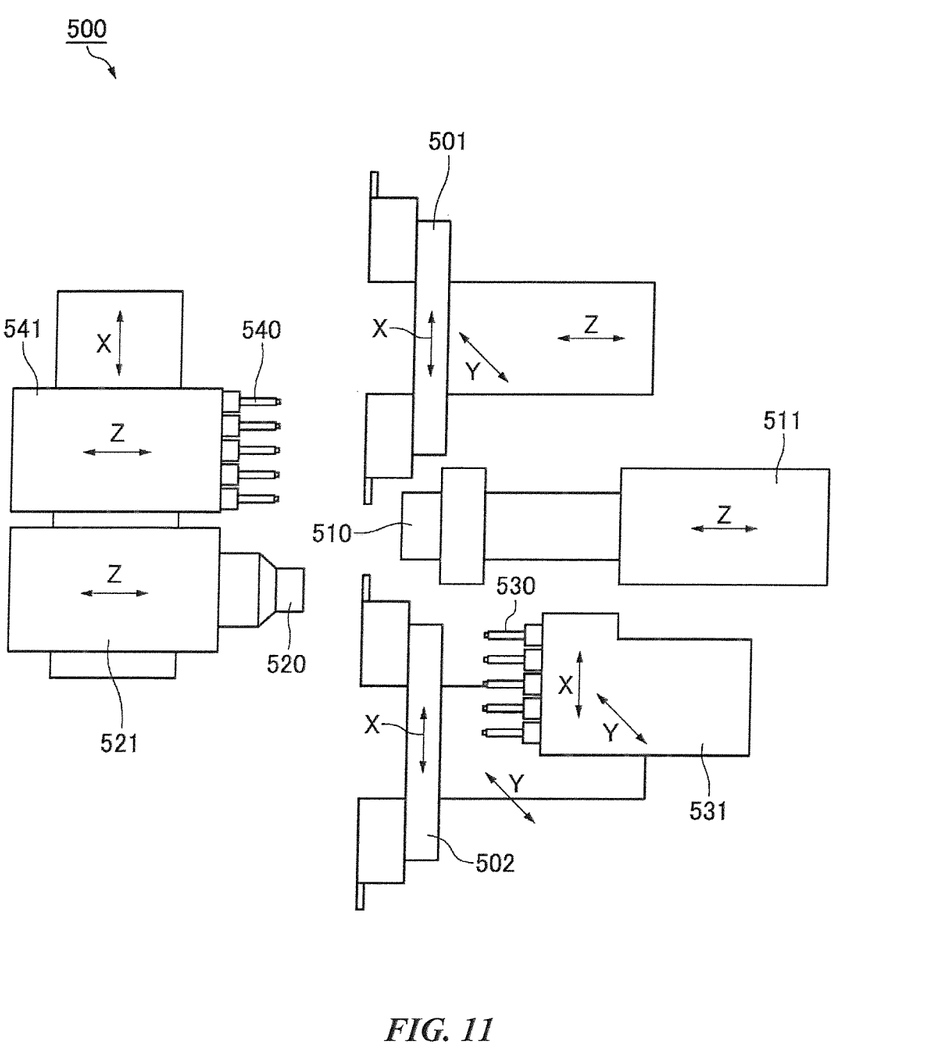
FIG. 11 is a plan view of a prior art machine tool.

For example, as shown in FIG. 11, there is known a machine tool 500 which includes a front spindle 510 disposed on a front headstock 511 and movable in an axis-line direction (Z-axis direction), a back spindle 520 having an axis line in parallel with that of the front spindle 510, disposed on a back headstock 521 and movable in the Z-axis direction as well as a direction orthogonal to the Z-axis direction (X-axis direction), and front and back tool posts 541 and 531 having a plurality of front working tools 540 and back working tools 530, respectively, wherein the front tool post 541 is configured to be movable in the Z- and X-axis directions.

The machine tool 500 is configured so that the back tool post 531 is movable in the X-axis direction as well as a direction orthogonal to the Z- and X-axis directions (Y-axis direction). The machine tool 500 sequentially works front and back sides of a workpiece while passing the workpiece between the spindles (see Patent Literature 1, for example).

CITATION LIST

Patent Literature

[Patent Literature 1] Japanese Patent Application Laid-Open No. 2005-111631 (p. 3, p. 4 and FIG. 8).

SUMMARY OF THE INVENTION

Technical Problem

However, since the front headstock 511 is configured to be movable only in the Z-axis direction and the front tool post 541 is configured to be movable only in the Z- and X-axis directions, the machine tool 500 described above has a problem that the plurality of front working tools 540 can be disposed only along the X-axis direction and the number of the front working tools 540 to be held by the front tool post 541 is limited.

Since the back headstock 521 is configured to be movable in the Z- and X-axis directions and the back tool post 531 is configured to be movable in the Y- and X-axis directions, the plurality of back working tools 530 can be disposed along the X- and Y-axis directions in performing the back works. However, when a workpiece is passed between the spindles to perform the desired front and back works, a total of 7 axes, i.e., one axis for the front headstock 511 and two axes for each of the back headstock 521, the front tool post 541 and the back tool post 531, need to be controlled separately per each work. Thus, the machine tool 500 described above has other problems that the control is complicated and that the many movable parts thereof make it difficult to achieve faster and more accurate operations.

Solution to Problems

In order to address the aforementioned problems, according to a first aspect of the present invention, there is provided a machine tool comprising a front spindle, a back spindle disposed so as to be opposed to the front spindle, a front tool post disposed so as to be opposed to the front spindle and holding a plurality of front working tools, and a back tool post disposed so as to be opposed to the back spindle and holding a plurality of back working tools, wherein the front and back working tools are arranged on the front and back tool posts, respectively, in a plurality of tiers in a Y-axis direction intersecting with axis lines of the front and back spindles, the front tool post and the back spindle are provided so as to be integrally movable in the Y-axis direction, and one of the plurality of tiers of the front working tools corresponding to the front spindle and another one of the plurality of tiers of the back working tools corresponding to the back spindle are switched by moving the back spindle in the Y-axis direction.

According to a second aspect of the present invention, the tiers of the front and back working tools are formed at a same pitch between adjacent tiers.

According to a third aspect of the present invention, the back spindle holds a first position where the both front and back spindles and the working tools in the tiers corresponding the respective spindles are positioned within one same plane, and a second position where the front spindle and the front working tools of the tier corresponding to the front spindle are positioned on one plane among two different planes and the back spindle and the back working tools of the tier corresponding to the back spindle are positioned on another plane.

According to a fourth aspect of the present invention, the back spindle is disposed so as not to be positioned on the same plane with any of the tiers of the front working tools, the front spindle is disposed so as not to be positioned on the same plane with any of the tiers of the back working tools, the back spindle holds a plurality of positions where the respective spindles and the working tools in the tiers corresponding to the respective spindles are positioned respectively on the same planes, and all of the tiers of the front working tools and all of the tiers of the back working tools are positioned on different planes at any of the plurality of positions.

According to a fifth aspect of the present invention, the front working tools and the back working tools are provided on the front and back tool posts, respectively, so as to form tool rows along an X-axis direction intersecting with the axis lines and a moving axis line of the back spindle in the Y-axis direction.

According to a sixth aspect of the present invention, the front and back working tools constituting all of the tool rows on the front and back tool posts are positioned on planes defined by the tool rows at a same pitch between adjacent tools.

According to a seventh aspect of the invention, the front and back working tools in all of the tool rows on the front and back tool posts are disposed so that the workpiece held by the back spindle is worked by one of the back working tools furthest from the front spindle at a position where the workpiece held by the front spindle is worked by one of the front working tools furthest from the back spindle.

Advantageous Effects of the Invention

According to the first aspect of the machine tool of the invention, because the front and back working tools are disposed on the front and back tool posts, respectively, in the plurality of tiers in the Y-axis direction intersecting with the axis lines (Z-axis direction) of the front and back spindles, the front and back tool posts are configured to be integrally movable in the Y-axis direction, and the tiers of the front working tools corresponding to the front spindle and the tiers of the back working tools corresponding to the back spindle can be switched by moving the back spindle in the Y-axis direction, it becomes possible to select the tools for the front and back works only by controlling the move of the back spindle in the Y-axis direction. Accordingly, this arrangement makes it easier to control switching of the tools, increases speed of the operation and improves accuracy of the machine tool by reducing the number of movable parts.

According to the arrangement described in the second aspect of the present invention, the particular tier of the front working tools and the particular tier of the back working tools can be selected simultaneously by controlling the position of the back spindle in the Y-axis direction by the number of the tiers and thus, the Y-axis control is simplified. According to the arrangement described in the third aspect of the present invention, it is possible to easily switch a first work performed by positioning the front and back spindles and the tiers of the working tools corresponding to the respective spindles on the same plane, and a second work of working on a side of the front spindle and of working on a side of the back spindle on the two different planes. Still further, it is possible to immediately start a subsequent work without moving the back spindle in the Y-axis direction after passing a workpiece between the front and back spindle, thus improving work efficiency.

According to the arrangement described in the fourth aspect of the present invention, the front and back working tools are not positioned on a same plane at any of the work positions in the Y-axis direction, so that it is possible to prevent the front and back working tools from interfering each other even if they move closer to each other during works. According to the arrangement described in the fifth aspect of the present invention, it is possible to easily switch and select a tool for use in the front work and a tool for use in the back work among the front and back working tools by controlling the position of the back spindle in the X-axis direction, which intersects with the axis line thereof (Z-axis direction) and the moving axis line thereof in the Y-axis direction, respectively. This arrangement permits to increase the number of tools that can be used with the simple control.

According to the arrangement described in the sixth aspect of the present invention, the position control of the back spindle in the X-axis direction is communized in selecting the front and back working tools on the same plane at the same time. This arrangement makes it easier to control the machine tool and enables to hold two workpieces by the front and back spindles and to perform the front and back works simultaneously. Thus, it is possible to shorten the work time and to speed up the operation.

According to the arrangement described in the seventh aspect of the invention, because the front and back working tools can be disposed in a whole moving range of the back spindle in the X- and Y-axis directions, it is possible to dispose and select a large number of tools and to deal with various kinds of works. Still further, by disposing the front and back working tools in order of works along the tool rows, respectively, the tools can be sequentially selected in the X-axis direction. This arrangement shortens a moving distance of the back spindle in the X-axis direction, enables to perform both of the front and back works in a sequential manner and improves work efficiency.

DETAILED DESCRIPTION OF THE PREFERRED EMBODIMENTS

First Embodiment

Figure 1:
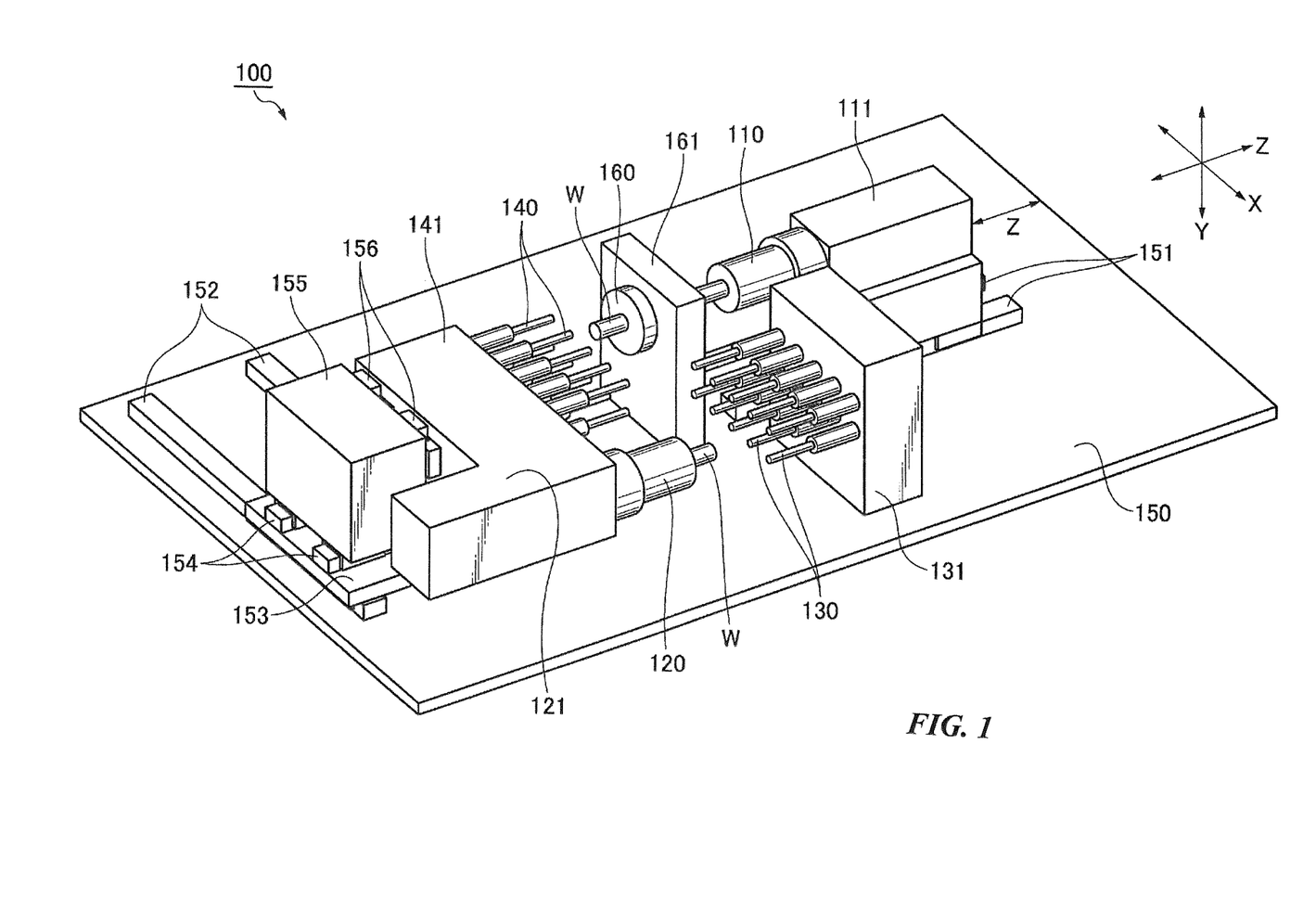
FIG. 1 is a perspective view of a machine tool of a first embodiment of the present invention.

As shown in FIG. 1, a machine tool 100 of a first embodiment of the present invention includes, on a base 150 thereof, a front headstock 111 for rotationally drivably holding a front spindle 110, a holder 121 for holding a back spindle 120 and front working tools 140, a back tool post 131 for holding back working tools 130, and a guide bush support 161 for supporting a guide bush 160. The guide bush support 161 is disposed and fixed on the base 150 so that an axis line of the guide bush 160 is aligned with an axis line of the front spindle 110. The holder 121 plays both roles of a back headstock for holding the back spindle 120 and a front tool post 141 for holding the front working tools 140.

The holder 121 rotationally and drivably supports the back spindle 120. The holder 121 and the front headstock 111 are disposed so that the front and back spindles 110 and 120 are opposed to each other with axis lines thereof being in parallel. This causes the front working tools 140 to be disposed at a position confronting the front spindle 110. The back tool post 131 is disposed and fixed on the base 150 at a position at which the back working tools 130 confront the back spindle 120.

A front Z-axis rail 151 is provided in an axis direction of the front spindle 110 (Z-axis direction) on the base 150. The front Z-axis rail 151 slidably supports the front headstock 111. The front headstock 111 is slidingly driven on the front Z-axis rail 151 by a driving apparatus not shown so that its position can be controlled. This arrangement enables to control the move of the front headstock 111 in the Z-axis direction on the front Z-axis rail 151.

An X-axis rail 152 is also provided in an X-axis direction horizontally orthogonal to the Z-axis direction on the base 150. The X-axis rail 152 is disposed at a position confronting the front Z-axis rail 151. The X-axis rail 152 slidably supports an X-axis slide table 153. The X-axis slide table 153 is slidingly driven on the X-axis rail 152 by a driving apparatus not shown so that its position can be controlled.

A back Z-axis rail 154 is provided in the Z-axis direction on the X-axis slide table 153. The back Z-axis rail 154 slidably supports a Z-axis slide post 155. The Z-axis slide post 155 is slidingly driven on the back Z-axis rail 154 by a driving apparatus not shown so that its position can be controlled. A Y-axis rail 156 is provided in a Y-axis direction, i.e., in a vertical direction, orthogonal to the X- and Z-axis directions on the Z-axis slide post 155.

The holder 121 is slidably supported on the Y-axis rail 156. The holder 121 is slidingly driven on the Y-axis rail 156 by a driving apparatus not shown so that its position can be controlled. This arrangement enables the holder 121 to be integrally moved and controlled in the mutually orthogonal Z-, X- and Y-axis directions with respect to the base 150 through the X-axis slide table 153 and the Z-axis slide post 155.

A workpiece W held by the front spindle 110 is inserted through and guided by the guide bush 160, and a part of the workpiece W protruding from the guide bush 160 is worked with the front working tools 140 under the control of the moves of the front headstock 111 and the holder 121. A workpiece W held by the back spindle 120 is worked with the back working tools 130 under the control of the move of the holder 121.

Tool rows are formed by pluralities (five each in the present embodiment) of the front working tools 140 and the back working tools 130 disposed on the holder 121 and the back tool post 131, respectively, in the X-axis direction. The front working tools 140 or the back working tools 130 constituting each tool row are disposed on a straight line along the X-axis direction. The holder 121 and the back tool post 131 hold the front working tools 140 and the back working tools 130, respectively, so that a plurality (two in the present embodiment) of tiers of tool rows are formed in the Y-axis direction. The pitches between the adjacent tiers of the tool rows on the holder 121 and the back tool post 130 are set to be equal.

The position of the holder 121 is controlled in the Y-axis direction so as to be able to be switched between a first position where the front and back spindles 110 and 120 are positioned on a same plane and the axis lines thereof are included in the same plane in the X- and Z-axis directions, and a second position where the front and back spindles 110 and 120 are positioned on different planes in the X- and Z-axis directions and the axis lines thereof are separated from each other in the Y-axis direction.

Figure 2:
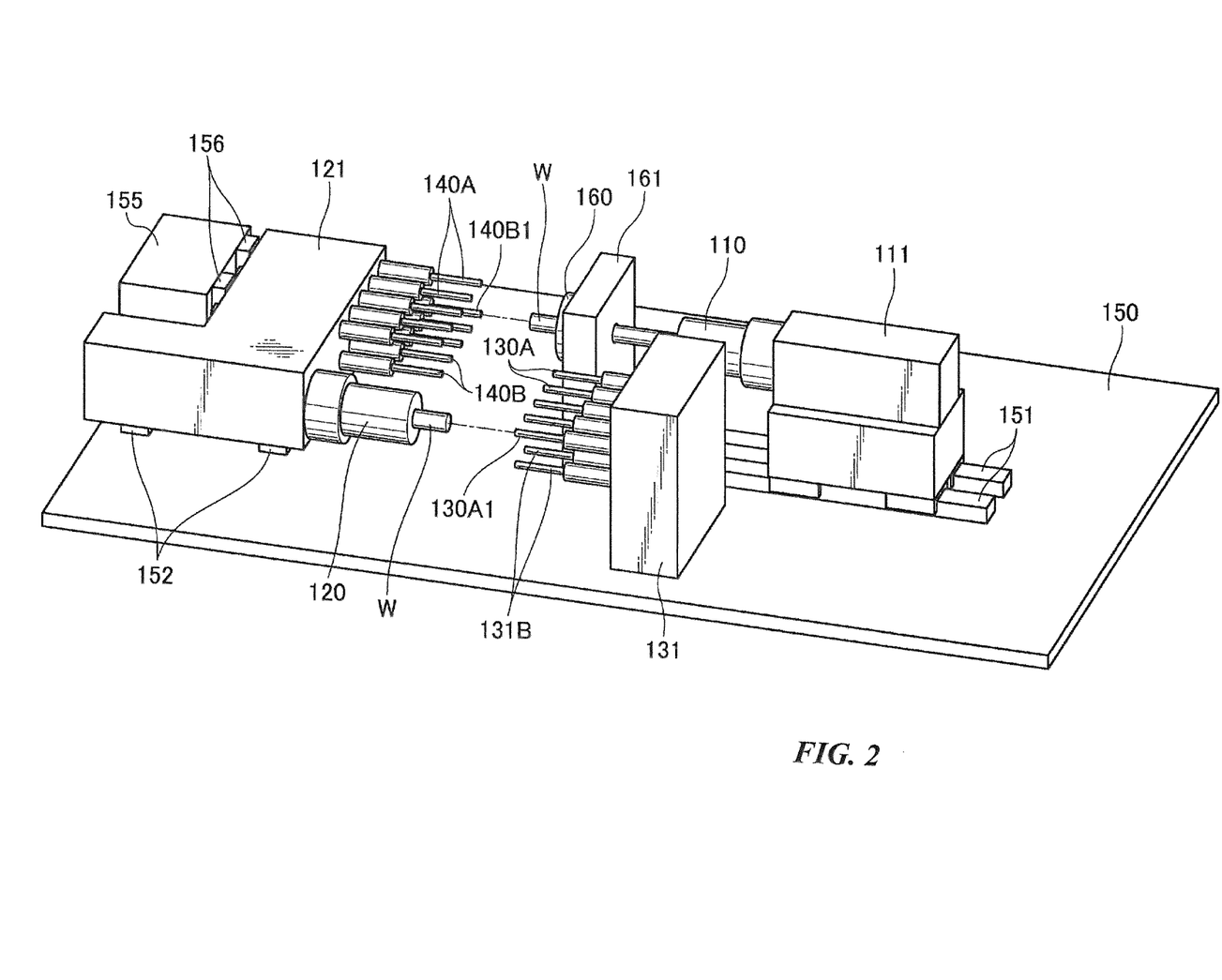
FIG. 2 is a perspective view of the machine tool in FIG. 1 in a first position.
Figure 3:
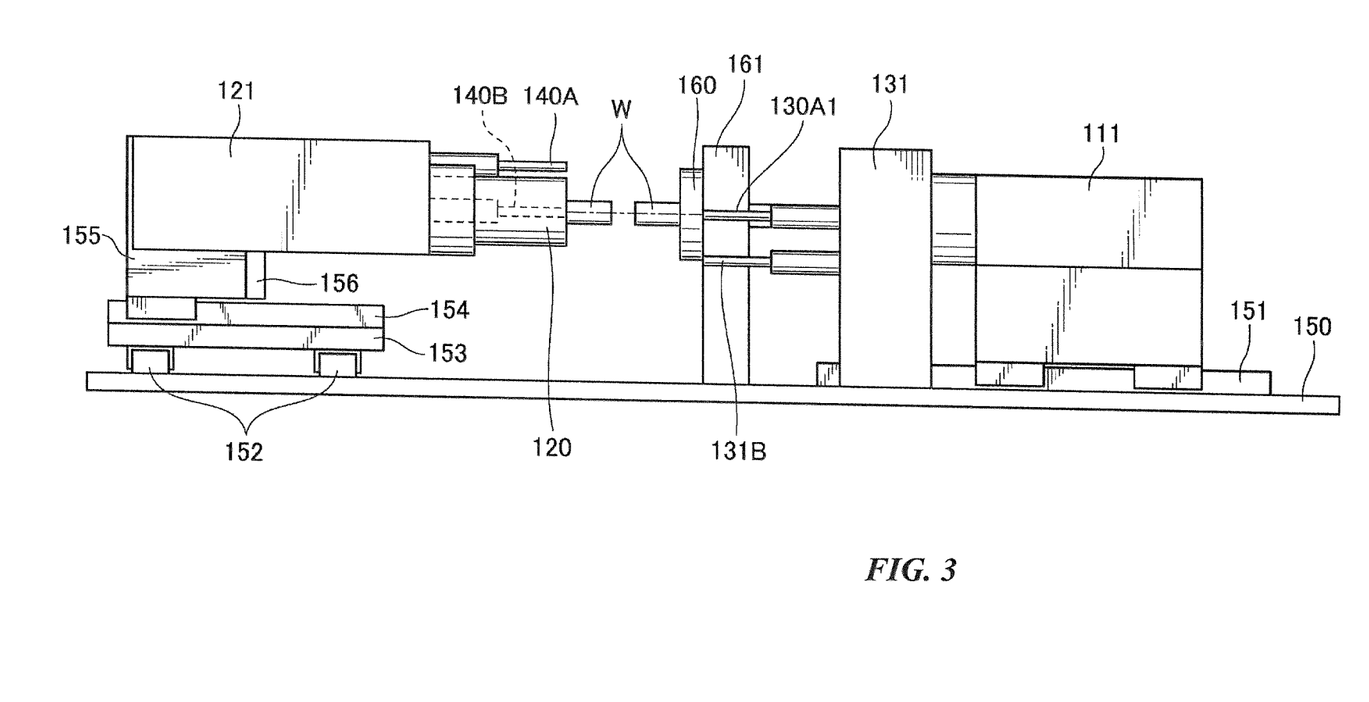
FIG. 3 is a side view of the machine tool in FIG. 2.

As shown in FIGS. 2 and 3, when the holder 121 is in the first position described above, the front and back spindles 110 and 120 are positioned so that the straight line of the tool row at the lower tier of the front working tools 140 along the X-axis direction and the straight line of the tool row at the upper tier of the back working tools 130 along the X-axis direction are included in the plane described above in which the axis lines of the front and back spindles 110 and 120 are included. This arrangement allows the both front and back spindles 110 and 120, front working tools 140B in the tool row at the lower tier on the front tool post 141, and back working tools 130A in the tool row at the upper tier on the back tool post 131 to be positioned on one plane (working plane) when the holder 121 is in the first position.

Thus, the workpiece W held by the front spindle 110 and the workpiece W held by the back spindle 120 can be worked with the front working tools 140B of the tool row at the lower tier on the front tool post 141 and the back working tools 130A of the tool row at the upper tier on the back tool post 131, respectively, on one working plane by switching the holder 121 to the first position. In particular, the workpiece W can be easily worked while being passed easily between the front and back spindles 110 and 120.

Figure 4:
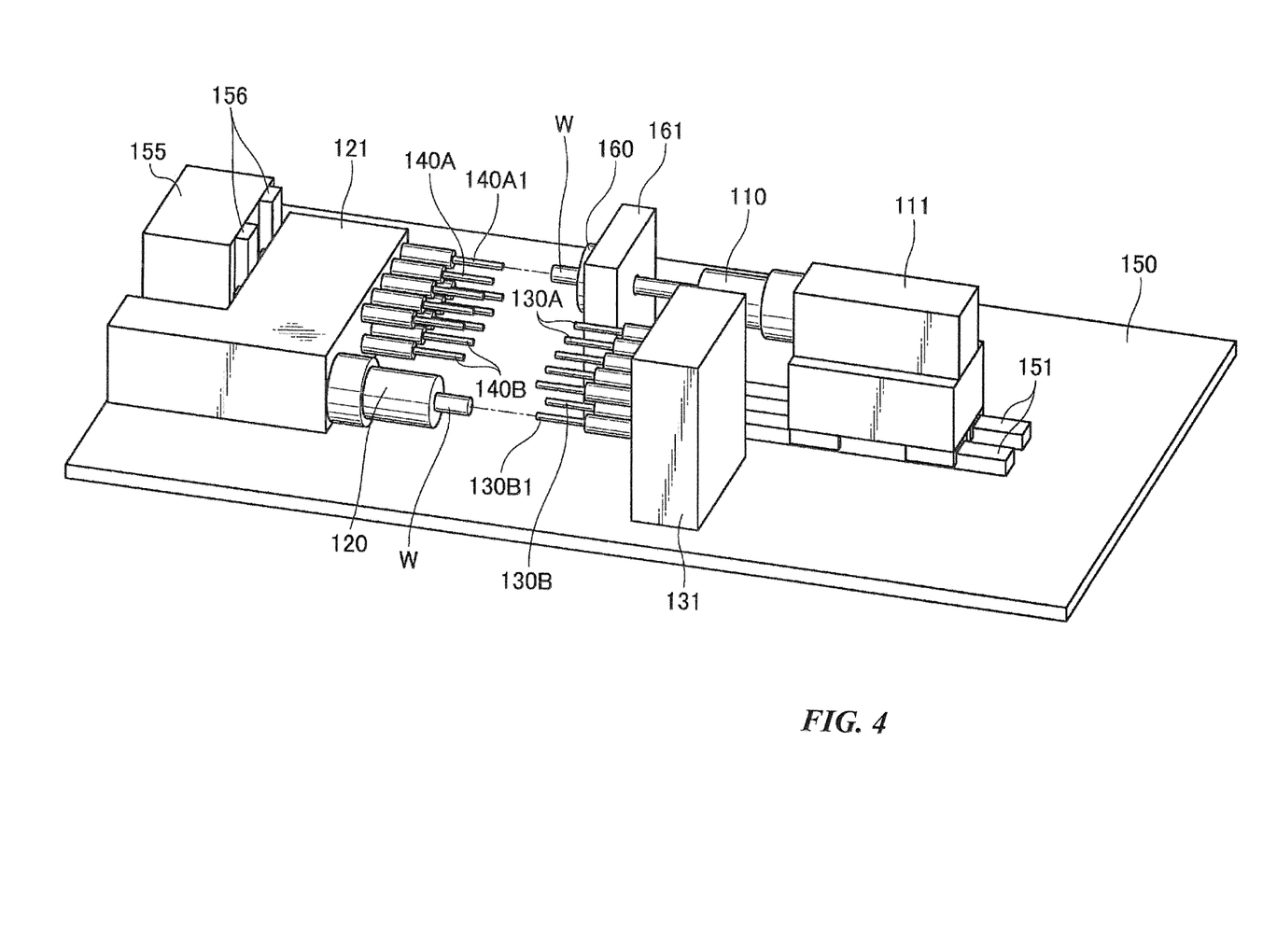
FIG. 4 is a perspective view of the machine tool in FIG. 1 in a second position.
Figure 5:
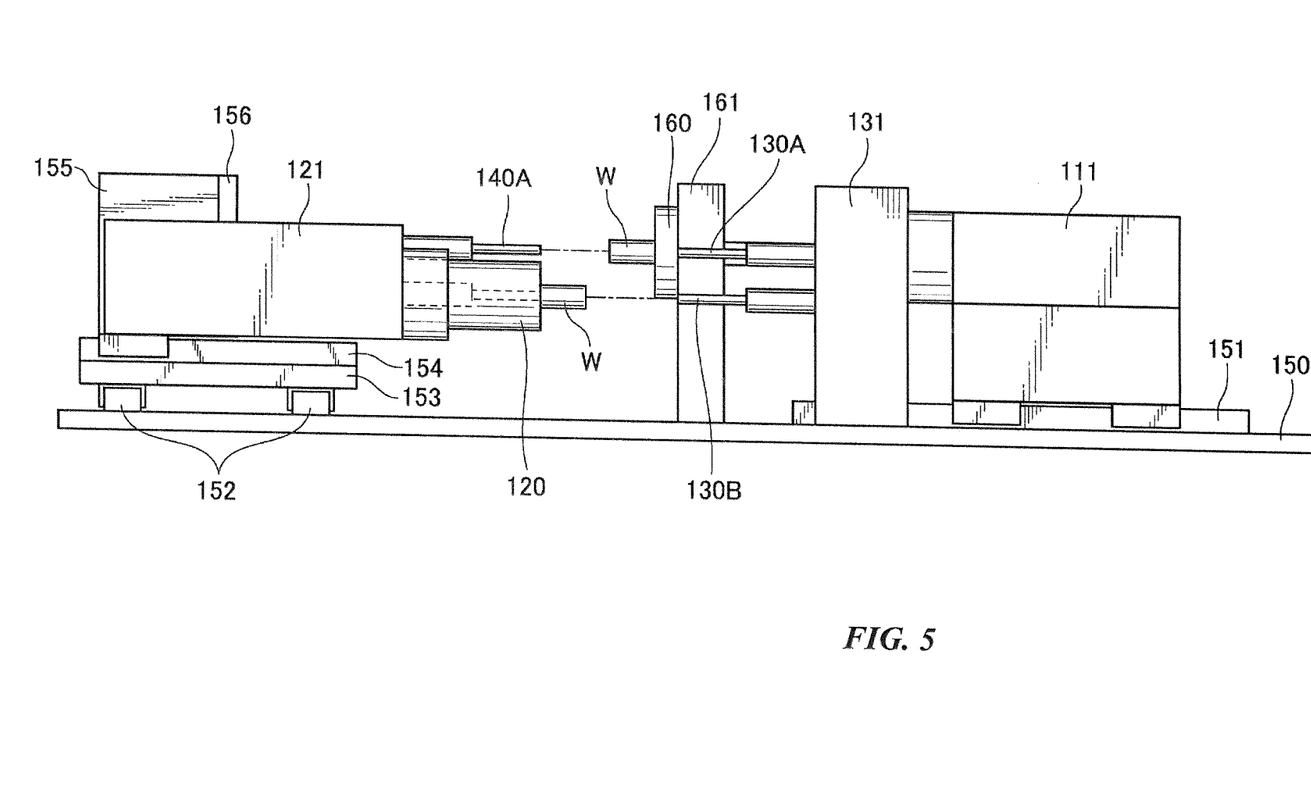
FIG. 5 is a side view of the machine tool in FIG. 4.

On the other hand, as shown in FIGS. 4 and 5, the front spindle 110, the back spindle 120, the front working tools 140 and the back working tools 130 are positioned so that, at the second position of the holder 121, the straight line of the tool row at the lower tier of the back working tools 130 along the X-axis direction is included in a plane in which the axis line of the back spindle 120 is included, and the straight line of the tool row at the upper tier of the front working tools 140 along the X-axis direction is included in a plane in which the axis line of the front spindle 110 is included.

This arrangement allows, at the second position of the holder 121, the front spindle 110 and the front working tools 140A in the tool row at the upper tier on the front tool post 141 are positioned on one plane (working plane), and the back spindle 120 and back working tools 130B in the tool row at the lower tier on the back tool post 131 are positioned on another plane (working plane) separated from the one plane in the Y-axis direction. Thus, the workpiece W held by the front spindle 110 and the workpiece W held by the back spindle 120 can be worked with the front working tools 140A or the back working tools 130B, respectively, on different working planes separated from each other in the Y-axis direction by moving and switching the holder 121 in the Y-axis direction to the second position.

Thus, the switching operation of the positions of the holder 121 only in one axis direction (the Y-axis direction) permits to simultaneously select the upper and lower tiers of the tool rows for use in the front work of the workpiece W held by the front spindle 110 and for use in the back processing of the workpiece W held by the back spindle 120. This arrangement also allows a simple and highly accurate positioning means such as a physical stopper to be used for controlling the position between the two positions described above, which, in turn, facilitates the control of switching of the positions and improves positional accuracy.

Still further, as shown in FIGS. 2 and 4, the pitches between any two adjacent tools in each tool row of the front and working tools 140 and 130 in the X-axis direction are set to be equal. The positional relationship in the X-axis direction among the front spindle 110, the back spindle 120, the front working tools 140 and the back working tools 130 is adapted so that the workpiece W held by the back spindle 120 is worked by a back working tool 130B1 (or 130A1), which is the furthest from the front spindle 110, at a position where the workpiece W held by the front spindle 110 is worked by a front working tool 140A1 (or 140B1), which is the furthest from the back spindle 120.

In case when the plurality of steps of the front and back works are sequentially performed on the workpiece W, the front working tools 140B for use in the front works are disposed in order of their use from a side closer to the back spindle 120 in the lower tool row of the holder 121 and the front working tools 140A for use in the front works are disposed in order of their use from a side further from the back spindle 120 in the upper tool row of the holder 121. Still further, the back working tools 130A for use in the back works are disposed in order of their use from a side closer to the front spindle 110 in the upper tool row of the back tool post 131 and the back working tools 130B for use in the back works are disposed in order of their use from a side further from the front spindle 110 in the lower tool row. With these arrangements, the tools for use in the front and back works can be sequentially selected by moving the holder 121 in the X-axis direction by one pitch (the distance between any two adjacent tools in the X-axis direction) at a time, enabling to reduce the moving distance of the holder 121 in the X- and Y-axis directions, to shorten the time needed to switch the tools to work efficiently.

Second Embodiment

Figure 6:
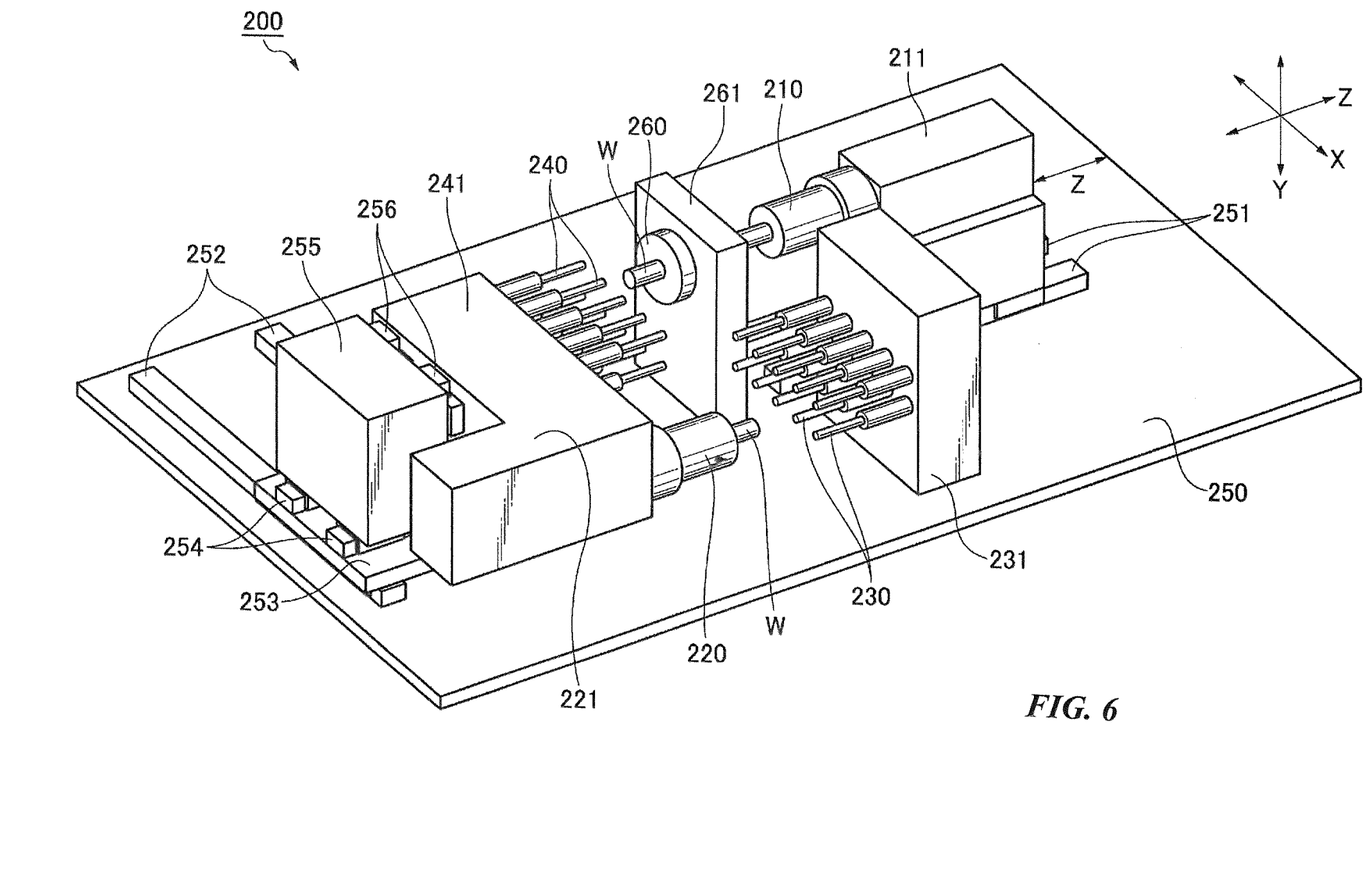
FIG. 6 is a perspective view of a machine tool of a second embodiment of the present invention.

As shown in FIG. 6, a machine tool 200 of a second embodiment of the present invention has the same configuration as the machine tool 100 of the first embodiment except positional relationships between a front spindle 210 and back working tools 230 in the Y-axis direction and between a back spindle 220 and front working tools 240 in the Y-axis direction. The reference numerals in FIGS. 6 to 10 having the same last two digits numbers as the reference numerals in FIGS. 1 to 5 represent the same or corresponding components with those of the first embodiment, and therefore a duplicate explanation of the function and operation of those components will be omitted here.

The back spindle 220 is disposed in the Y-axis direction so as not to be positioned on the same plane as any tiers of the front working tools 240. The front spindle 210 is provided in the Y-axis direction so as not to be positioned on the same plane as any tiers of the back working tools 230.

The position of the holder 221 is controlled in the Y-axis direction so as to be switched between a first position where the front spindle 210 is positioned on the same plane as the tool row at the lower tier of the front working tools 240 and the back spindle 220 is positioned on the same plane as the tool row at the upper tier of the back working tools 230, and a second position where the front spindle 210 is positioned on the same plane as the tool row at the upper tier of the front working tools 240 and the back spindle 220 is positioned on the same plane as the tool row at the lower tier of the back working tools 230.

Figure 7:
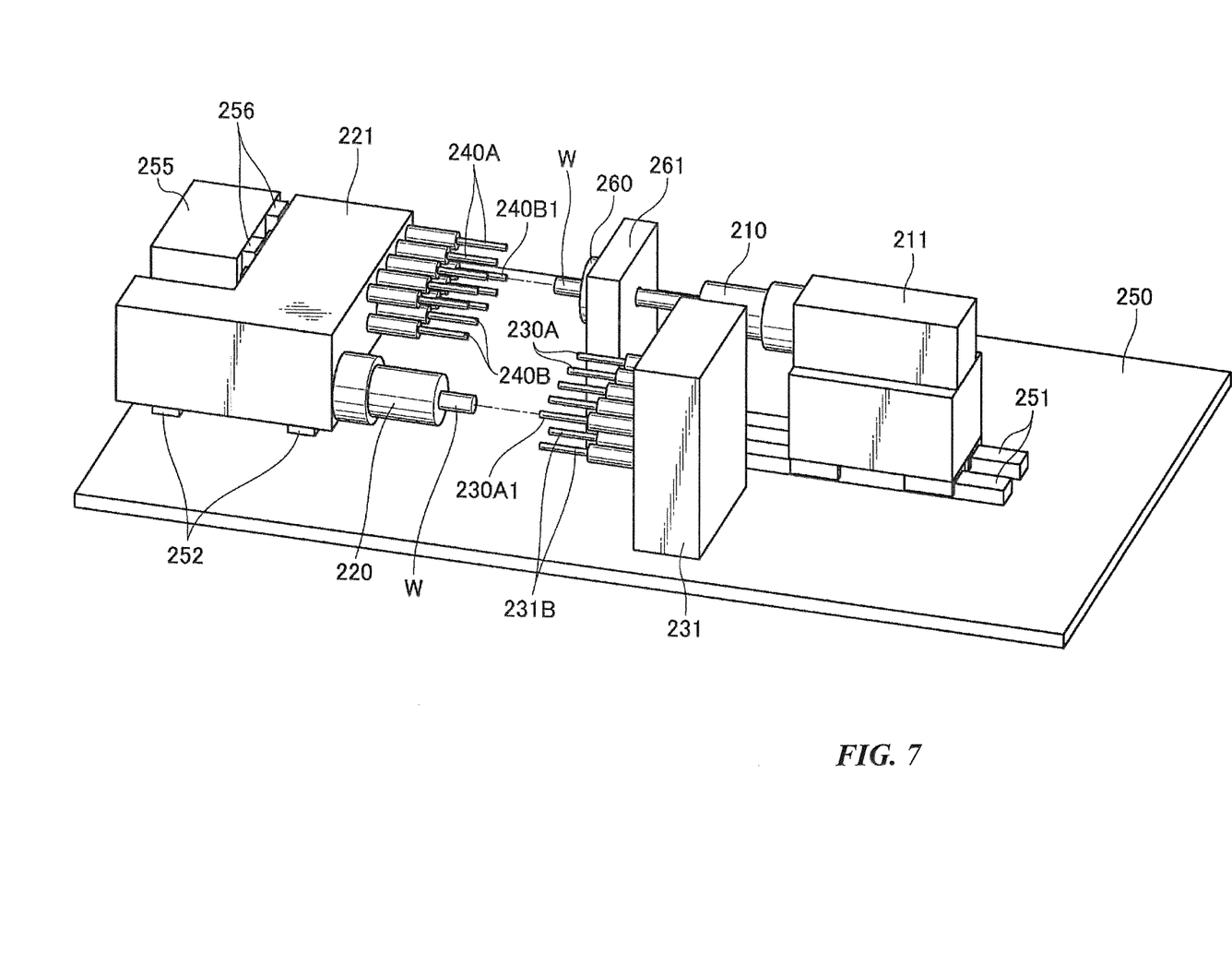
FIG. 7 is a side view of the machine tool in FIG. 6 in a first position.
Figure 8:
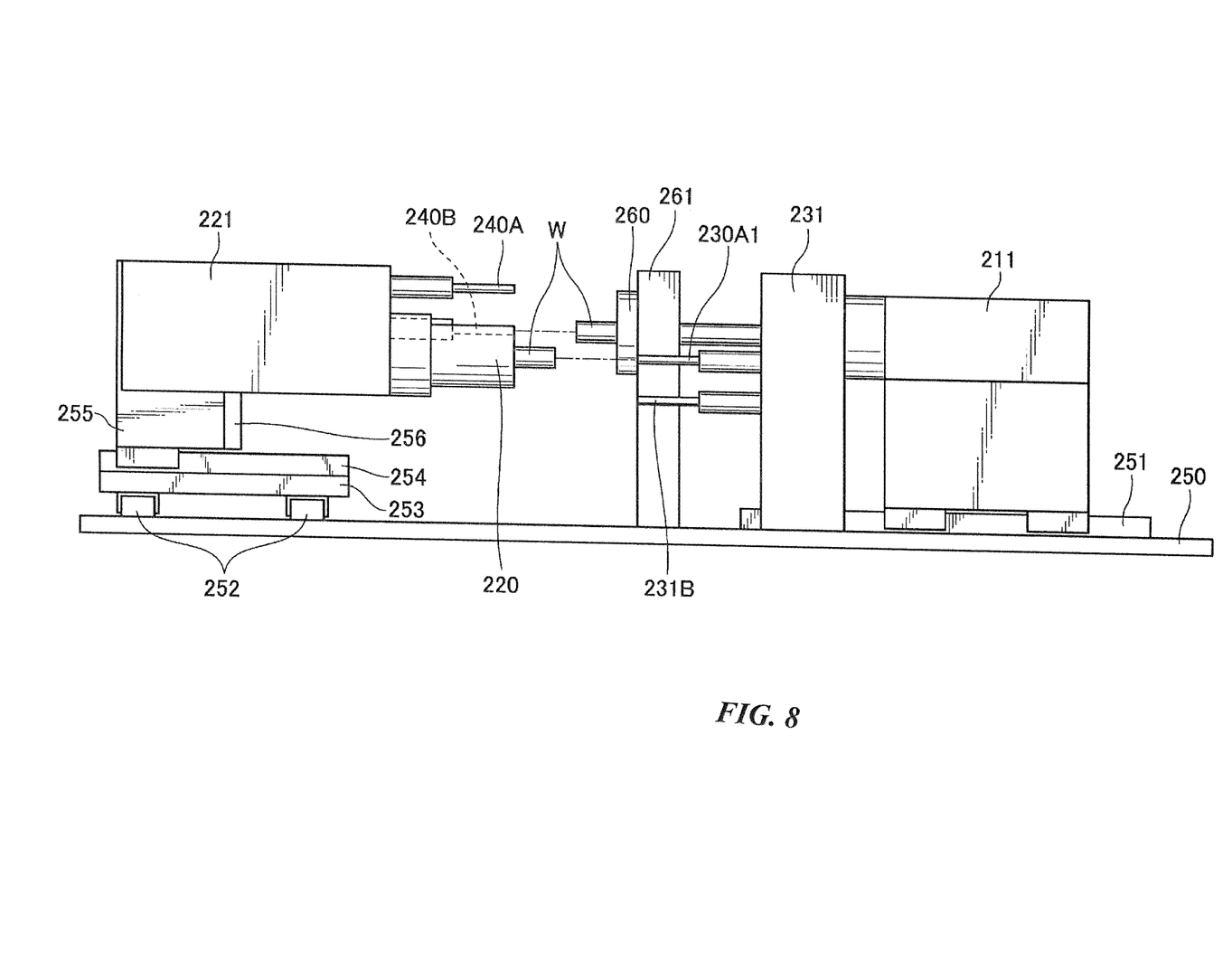
FIG. 8 is a side view of the machine tool in FIG. 7.

As shown in FIGS. 7 and 8, at the first position of the holder 221, a plane including an axis line of the front spindle 210 and a plane including an axis line of the back spindle 220 are not on the same level, though they are close to each other, and all of the tiers of the front working tools 240 and the back working tools 230 are positioned on different planes.

Figure 9:
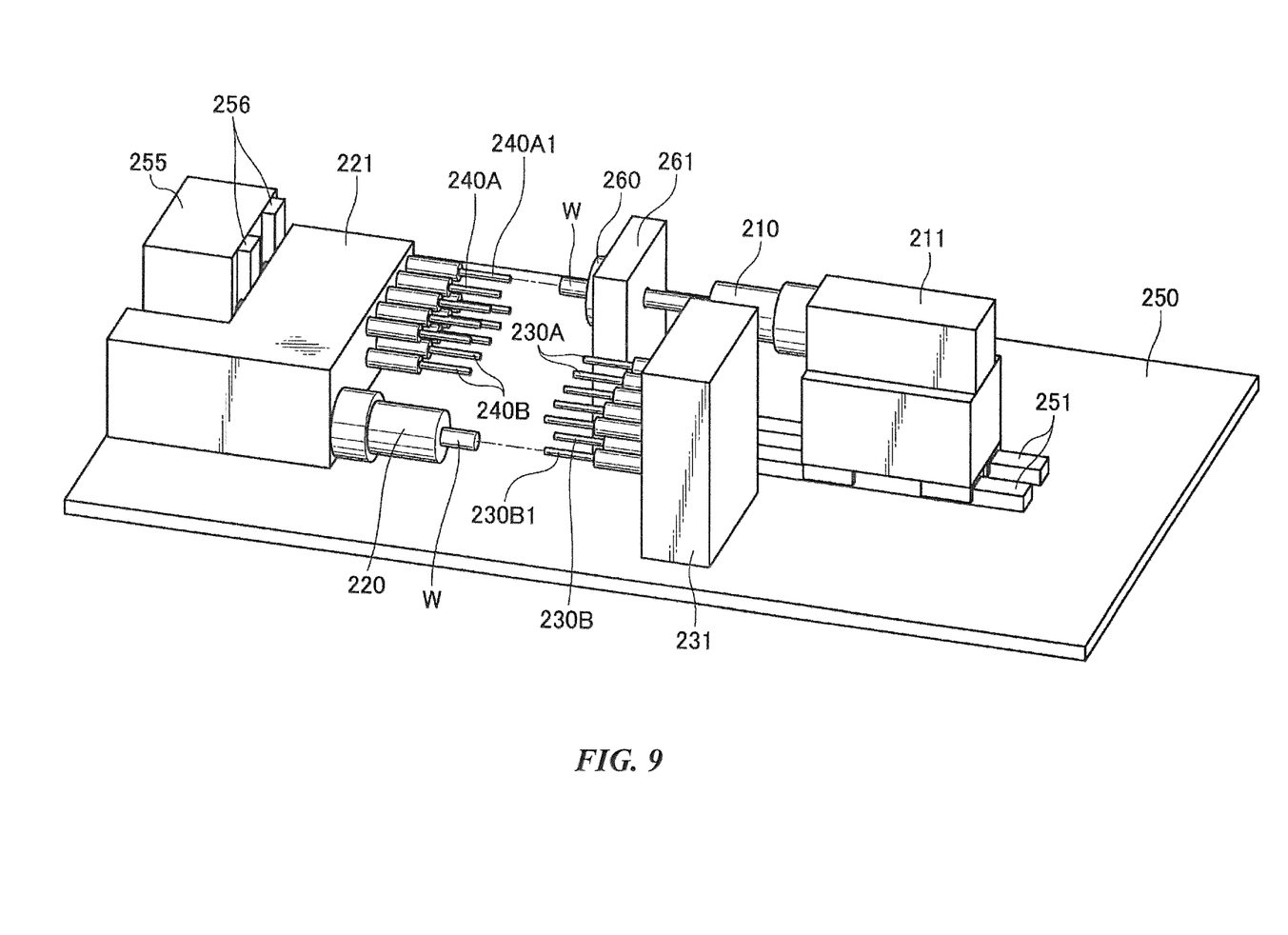
FIG. 9 is a perspective view of the machine tool in FIG. 6 in a second position.
Figure 10:
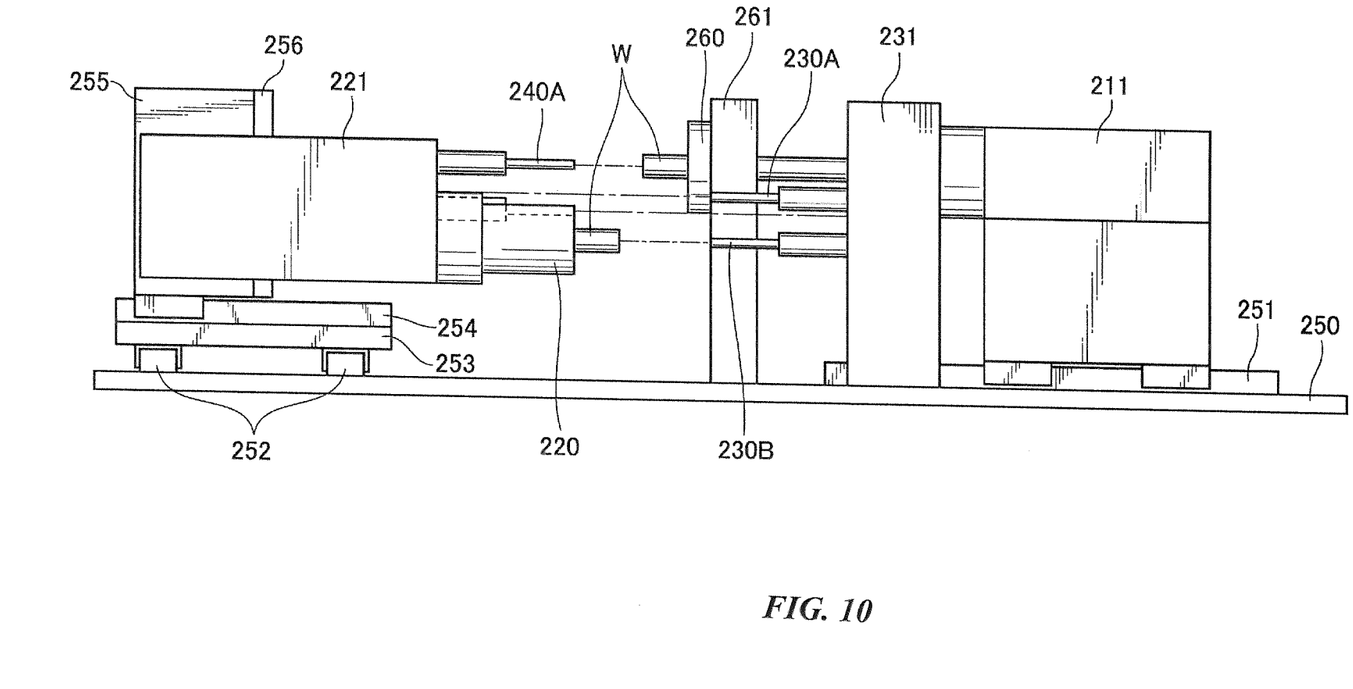
FIG. 10 is a side view of the machine tool in FIG. 9.

On the other hand, as shown in FIGS. 9 and 10, at the second position of the holder 221, the plane including the axis line of the front spindle 210 and the plane including the axis line of the back spindle 220 are separated from each other, and all of the tiers of the front working tools 240 and the back working tools 230 are positioned on different planes.

With this arrangement, the workpieces W held by the front and back spindles 210 and 220 can be worked with front working tools 240B constituting the tool row at the lower tier of the front working tools 240 and back working tools 230A constituting the tool row at the upper tier of the back working tools 230, respectively, on different working planes by switching the holder 221 to the first position. When the holder 221 is moved in the Y-axis direction to switch to the second position, the workpieces W held by the front and back spindles 210 and 220 can be worked with front working tools 240A constituting the tool row at the upper tier of the front working tools 240 and back working tools 230B constituting the tool row at the lower tier of the back working tools 230, respectively, on different working planes separated from each other in the Y-axis direction.

As with the first embodiment, the switching operation of the positions of the back headstock 221 performed by moving the holder 221 only in one axis direction (the Y-axis direction) permits to simultaneously select the upper or lower tier of the tool row for use in the front works of the workpiece W held by the front spindle 210 and of the tool row for use in the back works of the workpiece W held by the back spindle 220. This arrangement makes it easier to control the position between the first and second positions and to improve positional accuracy.

Still further, as shown in FIGS. 7 to 10, because all of the tiers of the front and back working tools 240 and 230 are positioned on the different level, it is possible to prevent the front and back working tools 240 and 230 from interfering with each other even if they move closer to each other during the works. It is noted that when the workpiece W is to be passed between the front and back spindles 210 and 220, the position of the holder 221 is controlled in the Y-axis direction to the position where the front and back spindles 210 and 220 are positioned on the same level. At that position, the workpiece W can be passed between the both spindles 210 and 220 by aligning the axis lines of the front and back spindles 210 and 220.

It is noted that the accompanying drawings are simplified for ease of understanding of the disposition and operation of the respective structural members, and the actual shape and size of each of the structural members are not limited to those shown in the drawings. The number and disposition of the front working tools 140 and 240 and of the back working tools 130 and 230 are also arbitrary. The bases 150 and 250 may be also installed in any direction of horizontal, diagonal or vertical direction. Furthermore, even though not shown, other desired structural members commonly used for a machine tool, such as a lathe tool, a workpiece handling mechanism, a working fluid supply mechanism and a machined chip excretion mechanism, may be provided appropriately.

The invention claimed is:

1. A machine tool comprising:
a front spindle;
a back spindle disposed so as to be opposed to the front spindle;
a front tool post disposed so as to be opposed to the front spindle and holding a plurality of front working tools; and
a back tool post disposed so as to be opposed to the back spindle and holding a plurality of back working tools, characterized in that:
the front and back working tools are arranged on the front and back tool posts, respectively, in a plurality of tiers in a Y-axis direction intersecting with axis lines of the respective front and back spindles;
the front tool post and the back spindle are provided so as to be integrally movable in the Y-axis direction; and
one of the plurality of tiers of the front working tools corresponding to the front spindle and another one of the plurality of tiers of the back working tools corresponding to the back spindle is switched by moving the back spindle in the Y-axis direction.

2. The machine tool according to claim 1, characterized in that the tiers of the front and back working tools are formed with a same pitch between adjacent tiers.

3. The machine tool according to claim 2, characterized in that the back spindle holds a first position where the both front and back spindles and the working tools in the tiers corresponding to the respective spindles are positioned within one same plane, and a second position where the front spindle and the front working tools of the tier corresponding to the front spindle are positioned on one plane among two different planes and the back spindle and the back working tools of the tier corresponding to the back spindle are positioned on another plane.

4. The machine tool according to claim 2, characterized in that:

the back spindle is disposed so as not to be positioned on the same plane with any of the tiers of the front working tools;

the front spindle is disposed so as not to be positioned on the same plane with any of the tiers of the back working tools;

the back spindle holds a plurality of positions where the respective spindles and the working tools in the tiers corresponding to the respective spindles are positioned respectively on the same planes; and all of the tiers of the front working tools and all of the tiers of the back working tools are positioned on different planes at any of the plurality of positions.

5. The machine tool according to claim 1 characterized in that the front and back working tools are provided on the front and back tool posts, respectively, so as to form tool rows along an X-axis direction intersecting with the axis lines and a moving axis line of the back spindle in the Y-axis direction.

6. The machine tool according to claim 5, characterized in that the front and back working tools constituting all of the tool rows on the front and back tool posts are positioned on planes defined by the tool rows at a same pitch between adjacent tools.

7. The machine tool according to claim 6, characterized in that the front and back working tools in all of the tool rows on the front and back tool posts are disposed so that the workpiece held by the back spindle is worked by one of the back working tools furthest from the front spindle at a position where the workpiece held by the front spindle is worked by one of the front working tools furthest from the back spindle.

* * * * *